(12) United States Patent
Yang et al.

(10) Patent No.: US 11,392,229 B2
(45) Date of Patent: Jul. 19, 2022

(54) TOUCH SCREEN HAVING HIGH REFLECTIVITY, MANUFACTURING METHOD THEREOF, AND TOUCH DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zhongzheng Yang, Beijing (CN); Ming Zhang, Beijing (CN); Qicheng Chen, Beijing (CN); Weijie Ma, Beijing (CN); Zhi Du, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 703 days.

(21) Appl. No.: 16/328,826

(22) PCT Filed: Sep. 21, 2018

(86) PCT No.: PCT/CN2018/107009
§ 371 (c)(1),
(2) Date: Feb. 27, 2019

(87) PCT Pub. No.: WO2019/153753
PCT Pub. Date: Aug. 15, 2019

(65) Prior Publication Data
US 2021/0365138 A1  Nov. 25, 2021

(30) Foreign Application Priority Data

Feb. 7, 2018 (CN) .......................... 201810124353.0

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04107* (2013.01)

(58) Field of Classification Search
CPC .................. G06F 3/0412; G06F 3/044; G06F 2203/04103; G06F 2203/04107
See application file for complete search history.

(56) References Cited

U.S. PATENT DOCUMENTS

2005/0266158 A1* 12/2005 Pokorny .............. G02B 5/3016
427/162
2014/0267168 A1 9/2014 Yilmaz et al.
(Continued)

FOREIGN PATENT DOCUMENTS

| CN | 101615093 A | 12/2009 |
|---|---|---|
| CN | 104020880 A | 9/2014 |

(Continued)

OTHER PUBLICATIONS

Search Report and Written Opinion for International Application No. PCT/CN2018/107009 dated Dec. 11, 2018.

*Primary Examiner* — Yaron Cohen
(74) *Attorney, Agent, or Firm* — Calfee, Halter & Griswold LLP

(57) ABSTRACT

A touch screen includes a base substrate; a first reflected layer disposed on a first surface of the base substrate; a second reflected layer disposed on a second surface of the base substrate; and a touch functional layer disposed on a surface of the second reflected layer away from the base substrate; wherein the first surface and the second surface are opposite to each other.

17 Claims, 3 Drawing Sheets

(56) References Cited

U.S. PATENT DOCUMENTS

2015/0351293 A1    12/2015  Ma
2020/0286961 A1*   9/2020   Jeong .................. H01L 27/3223

FOREIGN PATENT DOCUMENTS

| CN | 204178342 U | 2/2015 |
| CN | 108319404 A | 7/2018 |

* cited by examiner

TOUCH SCREEN HAVING HIGH REFLECTIVITY, MANUFACTURING METHOD THEREOF, AND TOUCH DISPLAY DEVICE

CROSS REFERENCE

The present application is based on International Application No. PCT/CN2018/107009, filed on Sep. 21, 2018, which is based upon and claims priority to Chinese Patent Application No. 201810124353.0, filed Feb. 7, 2018, the entire contents of which are hereby incorporated by reference.

TECHNICAL FIELD

The present disclosure relates to a touch screen, a manufacturing method thereof, and a touch display device.

BACKGROUND

One Glass Solution (OGS) touch screen is a capacitive touch screen which directly forms a touch electrode on a glass substrate, the glass substrate can simultaneously serve as both a protective glass and a touch sensor, thereby saving the number of glass substrates, and reducing the production cost of a touch display device.

When a screen of the touch display device is off, however, because the reflectivity of the OGS touch screen is low, the touch display device cannot realize mirror display.

SUMMARY

The present disclosure discloses a touch screen comprising: a base substrate; a first reflected layer disposed on a first surface of the base substrate; a second reflected layer disposed on a second surface of the base substrate; and a touch functional layer disposed on a surface of the second reflected layer away from the base substrate;

wherein the first surface and the second surface are opposite to each other.

In an exemplary embodiment, a material of the first reflected layer is niobium oxide.

In an exemplary embodiment, the first reflected layer has a thickness of 400 Å-800 Å.

In an exemplary embodiment, the second reflected layer includes a niobium oxide layer, which has a thickness of 400 Å-800 Å.

In an exemplary embodiment, the second reflected layer further includes a silicon oxide layer on a side of the niobium oxide layer away from the base substrate, the silicon oxide layer having a thickness of 0-1500 Å.

In an exemplary embodiment, the touch screen further includes an invisible layer located on a side of the touch functional layer away from the second reflected layer.

In an exemplary embodiment, the touch screen further includes an anti-fingerprint layer located on a side of the first reflected layer away from the base substrate.

The present disclosure also discloses a method for manufacturing a touch screen including:

forming a first reflected layer on a first surface of a base substrate;

forming a second reflected layer on a second surface of the base substrate, the first surface and the second surface being opposite to each other;

forming a touch functional layer on a surface of the second reflected layer away from the base substrate.

In an exemplary embodiment, the first reflected layer and the second reflected layer are both formed by a sputtering process.

The present disclosure also discloses a touch display device including a display screen and the touch screen described above.

In an exemplary embodiment, the touch display device further includes an optical clear adhesive disposed between the display screen and the touch screen, and configured to laminate the display screen and the touch screen.

In an exemplary embodiment, the display screen is a Liquid Crystal Display (LCD) display screen or an Organic Light Emitting Diode (OLED) display screen.

DETAILED DESCRIPTION

In order to make the above-described objects, features and advantages of the present disclosure more apparent and easier to understand, the present disclosure will be further described in detail with reference to the drawings and specific implementation manners.

A Touch Liquid Crystal Module (TLCM) can be formed by laminating an OGS touch screen and a display screen. Generally, the OGS touch screen has a transmittance of 80%-90%, therefore a touch display device which is formed by the laminating has a reflectivity of 5%-10%, and the touch display device has an excellent display effect when its screen is on, but cannot realize mirror display when its screen is off.

Figure 1:
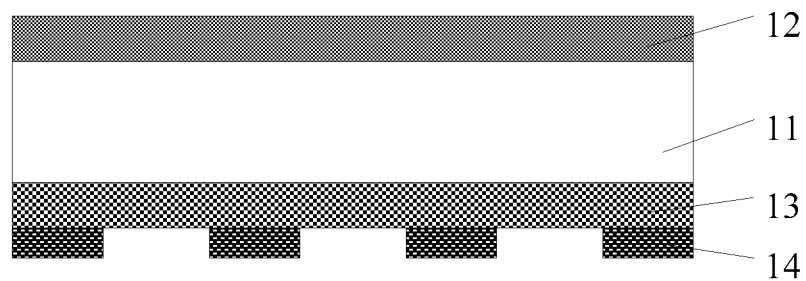
FIG. 1 is a structural schematic diagram illustrating a touch screen according to an embodiment of the present disclosure.

FIG. 1 is a structural schematic diagram illustrating a touch screen according to an embodiment of the present disclosure.

The embodiment of the present disclosure provides a touch screen including a base substrate 11; a first reflected layer 12 formed on a first surface of the base substrate 11; a second reflected layer 13 formed on a second surface of the base substrate 11; and a touch functional layer 14 formed on a surface of the second reflected layer 13 away from the base substrate, wherein the first surface and the second surface are opposite to each other.

A material of the first reflected layer 12 is niobium oxide ($Nb_2O_5$). In an exemplary embodiment, other materials such as zirconium oxide ($ZrO_2$) may also be used. The first reflected layer 12 has a thickness of 400 Å to 800 Å. In some embodiments, the first reflected layer 12 has a thickness of 600 Å.

In the embodiment of the present disclosure, the touch screen may be an OGS touch screen, and a glass substrate may be used as the base substrate 11. In an exemplary embodiment, a substrate made of other materials, such as a quartz substrate, a resin substrate, may also be used as the base substrate 11, which is not limited by the embodiment of the present disclosure.

The first reflected layer 12 is formed on the first surface of the base substrate 11, and the second reflected layer 13 is formed on the second surface of the base substrate 11, in this way, a reflectivity of the touch screen is significantly increased, and a reflectivity of a touch display device which is subsequently formed by laminating can reach 30%-50%. If only the first reflected layer 12 is formed on the first surface of the base substrate 11, or only the second reflected layer 13 is formed on the second surface of the base substrate 11, the reflectivity of the touch screen is increased to some extent, but the reflectivity of the touch display device which is subsequently formed by laminating the display screen and the touch screen cannot reach 30%, therefore, by forming only the first reflected layer 12 or the second reflected layer 13 on the base substrate 11, the touch display device which is subsequently formed by laminating the display screen and the touch screen cannot realize a mirror display function when its screen is off.

Figure 2:
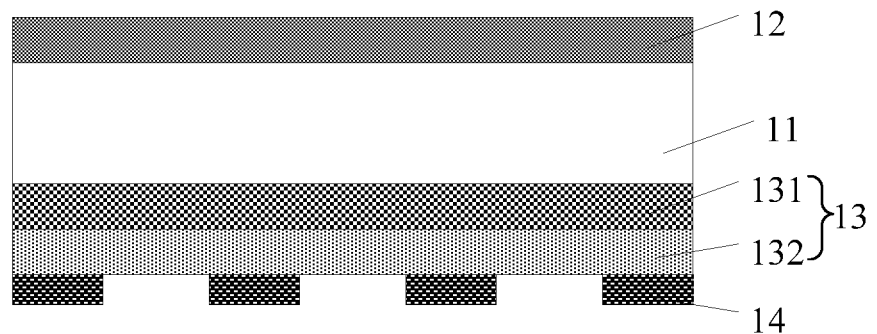
FIG. 2 is a structural schematic diagram illustrating another touch screen according to an embodiment of the present disclosure.

FIG. 2 is a structural schematic diagram illustrating another touch screen according to an embodiment of the present disclosure.

The touch screen shown in FIG. 2 differs from the touch screen shown in FIG. 1 in that the second reflected layer 13 has a different structure.

As shown in FIG. 1, the second reflected layer 13 includes a niobium oxide layer having a thickness of 400 Å to 800 Å. In some embodiments, the niobium oxide layer has a thickness of 600 Å.

As shown in FIG. 2, on the basis of the structure shown in FIG. 1, the second reflected layer 13 further includes a silicon oxide layer 132 located on a side of a niobium oxide layer 131 away from the base substrate 11, and the silicon oxide layer 132 having a thickness of 0 Å to 1500 Å. In some embodiments, the silicon oxide layer 132 has a thickness of 1200 Å.

According to optical matching design, as shown in FIG. 2, the reflectivity of the touch screen is further increased by adding the silicon oxide layer 132 on the niobium oxide layer 131.

In an exemplary embodiment, the niobium oxide layer in the second reflected layer 13 may alternatively include a zirconium oxide layer.

Figure 3:
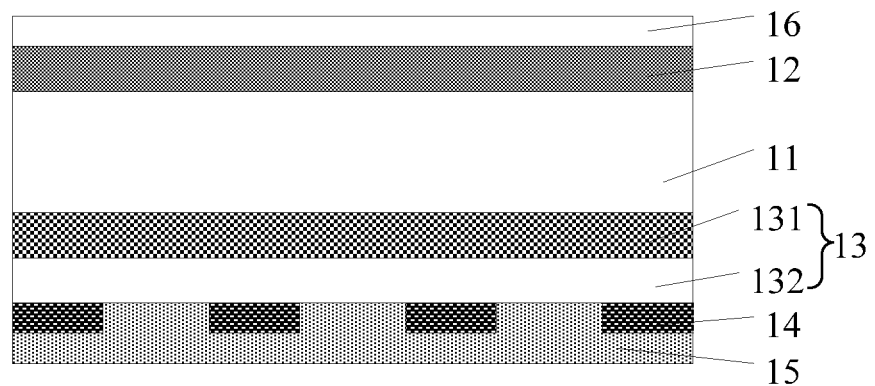
FIG. 3 is a structural schematic diagram illustrating still another touch screen according to an embodiment of the present disclosure.

FIG. 3 is a structural schematic diagram illustrating still another touch screen according to an embodiment of the present disclosure.

On the basis of the structure shown in FIG. 2, the touch screen further includes an invisible layer 15 located on a side of the touch functional layer 14 away from the second reflected layer 13. A material of the invisible layer 15 is silicon oxynitride ($SiO_xN_y$), which is used to solve the problem of the visible pattern of the touch functional layer 14 and make the touch functional layer 14 invisible.

In the embodiment of the present disclosure, the touch screen further includes an anti-fingerprint layer 16 located on a side of the first reflected layer 12 away from the base substrate 11. The anti-fingerprint layer 16 is provided on the first reflected layer 12 so as to prevent fingerprint residue which is caused by a direct touch of the first reflected layer 12 by a finger. The anti-fingerprint layer 16 can also be referred as an Anti Finger Film (ASF). A material of the anti-fingerprint layer 16 is an organic high molecular polymer.

In an exemplary embodiment, the invisible layer 15 and the anti-fingerprint layer 16 may also be formed on the touch screen as shown in FIG. 1, and specific position of the invisible layer 15 is the same as those shown in FIG. 3, and the anti-fingerprint layer 16 is the same as those shown in FIG. 3, which will not be elaborated herein.

In the embodiment of the present disclosure, the first reflected layer is formed on the first surface of the base substrate, the second reflected layer is formed on the second surface of the base substrate, and the touch functional layer is formed on the surface of the second reflected layer away from the base substrate, based on that both the first reflected layer and the second reflected layer have a high reflectivity, the reflectivity of the touch screen may be increased; by adding a silicon oxynitride layer only on the second reflected layer, and with level matching, a reflectivity of a touch display device which is subsequently formed by laminating can reach 30%-50%, and the touch display device may have a mirror display function when its screen is off, in the meanwhile, a display effect of the touch display device will be less affected when its screen is on, thereby enriching functions of the touch screen.

Figure 4:
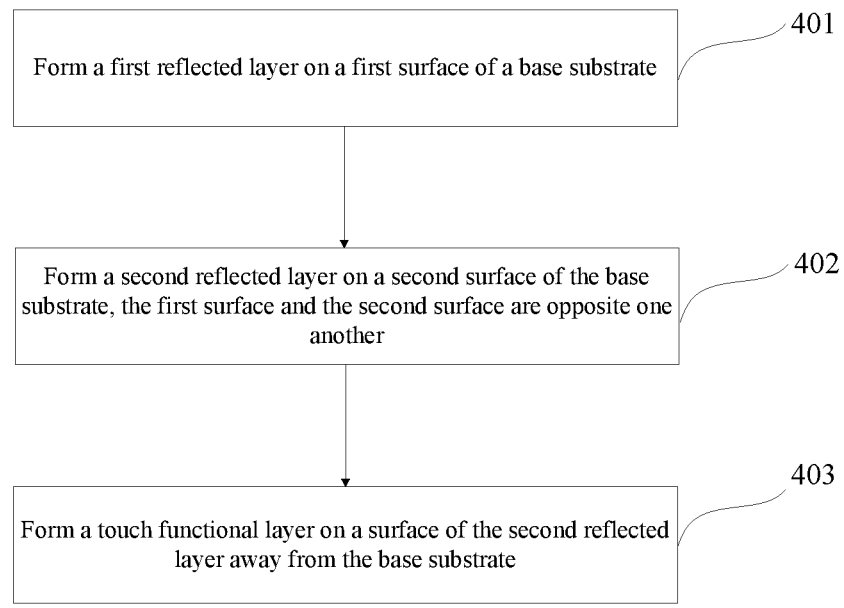
FIG. 4 is a flow chart showing a method of manufacturing a touch screen according to an embodiment of the present disclosure.

FIG. 4 is a flow chart showing a method of manufacturing a touch screen according to an embodiment of the present disclosure.

In step 401, a first reflected layer is formed on a first surface of a base substrate.

In the embodiment of the present disclosure, the first reflected layer 12 may be formed on the first surface of the base substrate 11 by a sputtering process.

As the base substrate 11, a glass substrate, a quartz substrate, a resin substrate or the like may be used. A material of the first reflected layer 12 may be niobium oxide ($Nb_2O_5$) or zirconium oxide ($ZrO_2$), etc., and the first reflected layer 12 has a thickness of 400 Å to 800 Å.

In step 402, a second reflected layer is formed on a second surface of the base substrate, the first surface and the second surface are opposite one another.

In the embodiment of the present disclosure, the second reflected layer 13 may be formed on the second surface of the base substrate 11 by a sputtering process, and the first surface and the second surface are opposite to each other and respectively located on both sides of the base substrate 11.

As shown in FIG. 1, in the case that the second reflected layer 13 includes a niobium oxide layer, a niobium oxide layer can be directly formed on the second surface of the base substrate 11 by a sputtering process, a material of the niobium oxide layer is niobium oxide ($Nb_2O_5$), and the niobium oxide layer has a thickness of 400 Å to 800 Å.

As shown in FIG. 2, in the case that the second reflected layer 13 includes a composite layer of the niobium oxide layer 131 and the silicon oxide layer 132, the niobium oxide layer 131 may be formed on the second surface of the base substrate 11 at first by a sputtering process. A material of the niobium oxide layer 131 is niobium oxide ($Nb_2O_5$) and the niobium oxide layer 131 has a thickness of 400 Å to 800 Å. The silicon oxide layer 132 is then formed on a side of the niobium oxide layer 131 away from the base substrate 11 by a sputtering process, a material of the silicon oxide layer 132 is silicon oxide ($SiO_2$) and the silicon oxide layer 132 has a thickness of 0-1500 Å.

In other words, both the first reflected layer 12 and the second reflected layer 13 are formed by a sputtering process. The structures of the first reflected layer 12 and the second reflected layer 13 are easy to implement without adding any apparatus, the process cost is low, and it is easy to achieve mass production.

The sputtering process is a process in which a target material is bombarded with particles of a certain energy, such as ions, neutral atoms, molecules, etc., in such a manner that atoms or molecules on a surface of the target material obtain sufficient energy to finally escape the target material, and the atoms or molecules that escaped are deposited onto a surface of a plated substrate to form a desired film.

In the case that the niobium oxide layer is formed by a sputtering process, a surface of niobium oxide is bombarded with particles of a certain energy, such that atoms or molecules on the surface of the niobium oxide escape, and are finally deposited on the base substrate 11. In the case that the silicon oxide layer 132 is formed by a sputtering process, a surface of silicon oxide is bombarded with particles of a certain energy such that atoms or molecules on the surface of the silicon oxide escape and are finally deposited on the niobium oxide layer 131.

In step 403, a touch functional layer is formed on a surface of the second reflected layer away from the base substrate.

In the embodiment of the present disclosure, the touch functional layer 14 is formed on the second reflected layer 13 by a patterning process. The patterning process generally includes procedures such as substrate cleaning, film formation, photoresist coating, exposure, development, etching, photoresist stripping. As for a metal layer, film formation is usually performed by physical vapor deposition (for example, magnetron sputtering method), and a pattern is formed by wet etching, and as for a non-metal layer, film formation is usually performed by chemical vapor deposition, and a pattern is formed by dry etching.

In an embodiment of the present disclosure, the invisible layer 15 may also be formed on the touch functional layer 14 to form the anti-fingerprint layer 16 on the first reflected layer 12.

In the embodiment of the present disclosure, the first reflected layer is formed on the first surface of the base substrate, the second reflected layer is formed on the second surface of the base substrate, and the touch functional layer is formed on the second reflected layer, based on that both the first reflected layer and the second reflected layer have a high reflectivity, the reflectivity of the touch screen can be increased, so that the reflectivity of the touch display device which is subsequently formed by bonding can reach 30%-50%, and the touch display device may have a mirror display function when its screen is off, in the meanwhile, a display effect of the touch display device will be less affected when its screen is on, thereby enriching functions of the touch screen.

Figure 5:
FIG. 5 is a structural schematic diagram illustrating a touch display device according to an embodiment of the present disclosure.

FIG. 5 is a structural schematic diagram illustrating a touch display device according to an embodiment of the present disclosure.

The embodiment of the present disclosure provides a touch display device including a display screen 51 and the touch screen described above.

For the detailed descriptions of the touch screen, reference may be made to the descriptions of the first embodiment and the second embodiment, which will not be elaborated in the embodiment of the present disclosure.

In the embodiment of the present disclosure, the display screen 51 and the touch screen are laminated by an optical clear adhesive 52. The optical clear adhesive may also be called an Optical Clear Resin (OCR), and the display screen 51 is attached to the touch screen by using the optical clear adhesive 52, so that the adhesion between the display screen 51 and the touch screen is excellent, and the display of the touch display device will be less affected.

It should be noted that the display screen 51 is a LCD display screen or an OLED display screen.

Figure 6:
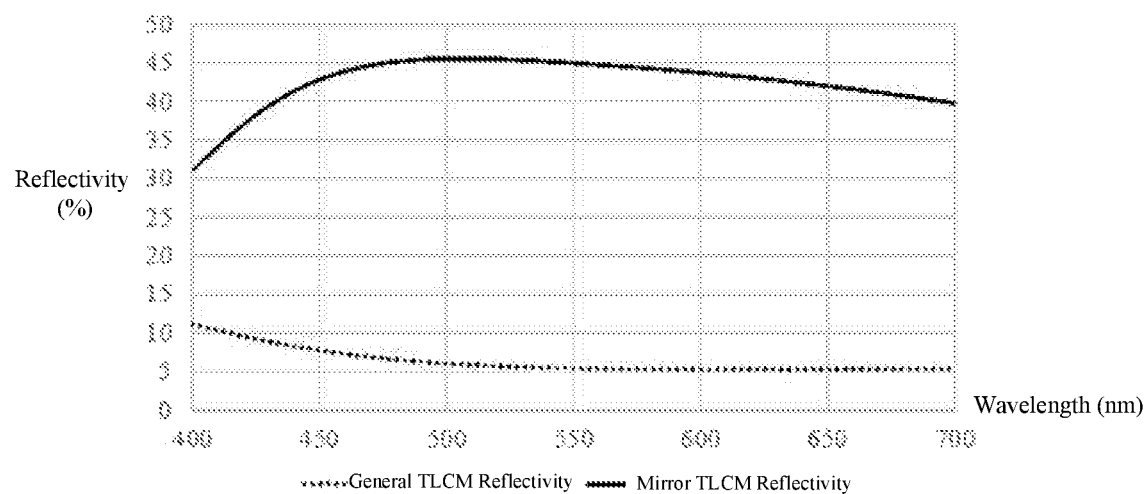
FIG. 6 is a graph showing a comparison of a reflectivity of a touch display device according to an embodiment of the present disclosure and a reflectivity of a prior touch display device.

FIG. 6 is a graph showing a comparison of a reflectivity of a touch display device according to an embodiment of the present disclosure and a reflectivity of a prior touch display device.

The abscissa in FIG. 6 represents a wavelength of light, the ordinate represents the reflectivity of the touch display device, and the curve indicated by the solid line refers to the reflectivity of the touch display device of the present disclosure, namely, a mirror TLCM reflectivity, and the curve indicated by the dotted line refers to the reflectivity of the prior touch display device, namely, a general TLCM reflectivity.

The graph of the comparison of the reflectivity shown in FIG. 6 is determined by experiments. As can be seen from FIG. 6, in the range of light of different wavelengths (400 nm-700 nm), the reflectivity of the touch display device according to the present disclosure is greater than the reflectivity of the prior touch display device, and the reflectivity of the touch display device according to the present disclosure can reach 30%-50%.

In practical applications, the touch display device may be any products or components having a display function, such as a mobile phone, a tablet computer, a television, a display, a notebook computer, a navigator, and the like.

In the embodiment of the present disclosure, the touch display device includes the display screen and the touch screen described above, the first reflected layer is formed on the first surface of the base substrate, the second reflected layer is formed on the second surface of the base substrate, and the touch functional layer is formed on the second reflected layer, based on that both the first reflected layer and the second reflected layer have a high reflectivity, the reflectivity of the touch screen can be increased, so that the reflectivity of the touch display device which is subsequently formed by bonding can reach 30%-50%, and the touch display device may have a mirror display function when its screen is off, in the meanwhile, a display effect of the touch display device will be less affected when its screen is on, thereby enriching functions of the touch screen.

For simple description, the foregoing method embodiments are all expressed as a series of action combinations, but those skilled in the art should know that the present disclosure is not limited by the order of the actions described herein, it is because that according to the present disclosure, some steps can be performed in other orders or simultaneously. Secondly, those skilled in the art should also understand that the embodiments described in the description are all preferred embodiments, and the involved actions and modules are not necessarily required by the present disclosure.

The embodiments in the description are described in a progressive manner, and each of the embodiments focuses on differences from other embodiments, and the same or similar parts among the embodiments can be referred to each other.

Finally, it should also be noted that, in this text, relational terms such as first and second, etc., are only used to distinguish one entity or operation from another entity or operation, and do not necessarily require or imply any such actual relations or orders present between these entities or operations. Moreover, the terms "including", "comprising" or any other variations thereof are intended to cover a non-exclusive inclusion such that processes, methods, articles, or devices that comprise a series of elements include not only those elements but also include other elements that are not explicitly listed. Alternatively, elements inherent to such processes, methods, articles, or devices may also be included. In case of no more limitations, an element defined by phase "including a . . . " does not exclude the situation where additional identical elements are present in the processes, the methods, the articles, or the devices including the element.

A touch screen, a manufacturing method thereof, and a touch display device provided by the present disclosure are described above in detail. Specific examples are used herein to describe the principles and embodiments of the present disclosure. The description of the embodiments above is only intended to help the understanding of the method and its core idea of the present disclosure; meanwhile, those of ordinary skill in the art, according to the idea of the present disclosure, will make changes in the specific embodiments and application ranges. In summary, the contents of this description should not be constructed as limiting the present disclosure.

What is claimed is:

1. A touch screen having a high reflectivity, comprising: a base substrate being one of the following substrates: a glass substrate, a quartz substrate, or a resin substrate; a first reflected layer disposed on a first surface of the base substrate; a second reflected layer disposed on a second surface of the base substrate, wherein the second reflected layer cooperates with the first reflected layer to increase a reflectivity of the touch screen, causing a touch display device subsequently formed by lamination to have a reflectivity between 30% to 50%, and a mirror display function of the touch display device when the touch screen is off; and a touch functional layer disposed on a surface of the second reflected layer away from the base substrate, with an invisible layer located on a side of the touch functional layer away from the second reflected layer, making the touch functional layer invisible; wherein the first surface and the second surface are opposite to each other.

2. The touch screen according to claim 1, wherein a material of the first reflected layer is niobium oxide.

3. The touch screen according to claim 1, wherein the first reflected layer has a thickness of 400 Å-800 Å.

4. The touch screen according to claim 1, wherein the second reflected layer comprises a niobium oxide layer having a thickness of 400 Å-800 Å.

5. The touch screen according to claim 4, wherein the second reflected layer further comprises a silicon oxide layer located on a side of the niobium oxide layer away from the base substrate, the silicon oxide layer having a thickness of 0-1500 Å.

6. The touch screen according to claim 1, wherein the touch screen further comprises an anti-fingerprint layer located on a side of the first reflected layer away from the base substrate.

7. The touch display device comprising a display screen and the touch screen according to claim 1.

8. The touch display device according to claim 7, further comprising: an optical clear adhesive disposed between the display screen and the touch screen, and configured to laminate the display screen and the touch screen.

9. The touch display device according to claim 7, wherein the display screen is a LCD display screen or an OLED display screen.

10. The touch screen according to claim 2, wherein the first reflected layer has a thickness of 400 Å-800 Å.

11. The touch screen according to claim 2, wherein the second reflected layer comprises a niobium oxide layer having a thickness of 400 Å-800 Å.

12. The touch screen according to claim 2, wherein the touch screen further comprises an anti-fingerprint layer located on a side of the first reflected layer away from the base substrate.

13. The touch screen according to claim 3, wherein the touch screen further comprises an anti-fingerprint layer located on a side of the first reflected layer away from the base substrate.

14. The touch display device comprising a display screen and the touch screen according to claim 2.

15. The touch display device comprising a display screen and the touch screen according to claim 3.

16. A method for manufacturing a touch screen having a high reflectivity, comprising: forming a first reflected layer on a first surface of a base substrate, the base substrate being one of the following substrates: a glass substrate, a quartz substrate, or a resin substrate; forming a second reflected layer on a second surface of the base substrate, the first surface and the second surface being opposite to each other, wherein the second reflected layer cooperates with the first reflected layer to increase a reflectivity of the touch screen, causing a touch display device subsequently formed by lamination to have a reflectivity between 30% to 50%, and a mirror display function of the touch display device when the touch screen is off; and forming a touch functional layer on a surface of the second reflected layer away from the base substrate, with an invisible layer located on a side of the touch functional layer away from the second reflected layer, making the touch functional layer invisible.

17. The method according to claim 16, wherein the first reflected layer and the second reflected layer are both formed by a sputtering process.

* * * * *